United States Patent [19]

Brooks

[11] 4,126,759

[45] Nov. 21, 1978

[54] COUPLING MEANS

[75] Inventor: Philip L. Brooks, Menlo Park, Calif.

[73] Assignee: Raychem Corporation, Menlo Park, Calif.

[21] Appl. No.: 779,726

[22] Filed: Mar. 21, 1977

Related U.S. Application Data

[63] Continuation of Ser. No. 592,024, Jun. 30, 1975, Pat. No. 4,092,193.

[51] Int. Cl.$^2$ .............................................. H01R 5/04
[52] U.S. Cl. ..................................... 174/94 R; 156/49; 156/503
[58] Field of Search ..................... 156/49, 83, 84, 85, 156/86, 293, 294, 295, 303.1, 303, 304, 306, 309, 305, 423, 502, 503; 285/41, 187, 239, 241, 244, 249, 258, 292, 399; 428/53; 138/141, 155, DIG. 1; 174/94 R, DIG. 8

[56] References Cited

U.S. PATENT DOCUMENTS

| | | | |
|---|---|---|---|
| 3,243,211 | 3/1966 | Wetmore | 156/86 |
| 3,297,819 | 1/1967 | Wetmore | 156/48 |
| 3,610,291 | 10/1971 | Heslop et al. | 156/86 |
| 4,035,534 | 7/1977 | Nyberg | 156/84 |

FOREIGN PATENT DOCUMENTS

| | | |
|---|---|---|
| 620,659 | 10/1935 | Fed. Rep. of Germany. |
| 2,344,086 | 4/1974 | Fed. Rep. of Germany. |
| 688,172 | 2/1953 | United Kingdom. |
| 1,033,959 | 6/1966 | United Kingdom. |

Primary Examiner—William A. Powell
Assistant Examiner—William H. Thrower
Attorney, Agent, or Firm—Lyon & Lyon

[57] ABSTRACT

Described herein are coupling means for joining substrates, for example, tubular articles, which include an inner member, having disposed thereon a fusible agent for binding the substrates together, and an outer member. The substrates to be joined are inserted between the fusible agent and outer member and the resulting assembly is heated. The application of heat is maintained until it permeates the assembly and raises the temperature of the fusible agent enough that it melts and flows through and/or about the substrates to be joined. The inner and outer members act to confine the melted fusible agent by defining boundaries between which it can flow. Longitudinal flow of the agent can be controlled by limiting the area heated, by the configuration of the coupling members or substrates, or by providing the coupling with additional members that "dam" longitudinal flow. When the heating is discontinued, the fusible agent hardens to bind the substrates together. Either the inner member, outer member, or both may be a heat recoverable or spring member to provide compressive forces in the area of the joint being formed to facilitate the flow of the fusible material.

27 Claims, 15 Drawing Figures

COUPLING MEANS

This is a continuation, of application Ser. No. 592,024, filed June 30, 1975, now U.S. Pat. No. 4,092,193.

FIELD OF THE INVENTION

This invention relates to a method for joining substrates. In another respect, it relates to novel coupling means by which substrates may be joined. More specifically, this invention relates to means for joining substrates in which a fusible binding agent is caused to melt and flow through and/or about the substrates to be joined and then harden to complete the union.

BACKGROUND OF THE INVENTION

It is preferable, and often necessary, to have a means and method for joining products or materials, particularly those manufactured in a continuous process such as weaving, extrusion or rolling, to each other or a second material in a manner which embodies as many of the characteristics of the original product, for example, physical form or chemical properties, as is possible. For example, when joining cylindrical substrates it is frequently advantageous to maintain an unbroken cylindrical form with minimum disturbance of the inside and outside diameters. Similarly, it is often advantageous to join flexible materials with a flexible material or metallic members by means of an intermetallic joint while preserving the basic form or configuration.

Such considerations are particularly significant when the mechanical properties of the joint must be closely matched to those of the substrates. A rigid crimp joint on a soft line can cause the line to be extruded into a thin weak section while a soft joint on a rigid line is prone to being overstressed by the stronger material on either side. Furthermore, the shape or silhouette of the joint can be significant also. For example, a continuous form is less prone to stress points than a discontinuous one. A discontinuous joint may also be undesirable simply because it cannot fit into the space demanded of it or be undesirable because an electrical or chemical continuity has been interrupted.

In general it can be said that it is difficult to obtain a union between materials once they have been produced having properties that closely approach the properties of the materials themselves. The joining of metallic substrates exemplifies these problems. For example, as many products are becoming ever smaller in response to the demands of modern technology, arc or gas welding is becoming an increasingly unwieldy, if not impossible, process to employ in diverse applications. Also, the high heat generated in such processes can be a problem if the products to be joined or surrounding materials are delicate.

Conventional soldering is inappropriate where the union formed must have substantially the same inner or outer configuration. Solder must also be contained once melted and if the substrates being joined are large in dimension or mass, the heat required to bring them to the soldering temperature may damage surrounding materials. Furthermore, in conventional soldering the heat and solder are both applied from the outside of the joint to be formed. This is ineffective in joining substrates that are of woven, perforated or otherwise porous construction, because the molten solder will flow longitudinally along and/or through the intersticies of the hot outer substrate, and will not consistently flow into the intersticies of the cooler inner substrate.

The joining of metallic members to each other or a plastic member by means of a fusible plastic adhesive is accompanied by many of the problems encountered in soldering particularly that of containing the melted material to achieve a specific form. Furthermore, pressure is usually required when a plastic bond is made and its application is extremely difficult when it must be applied over a cylinder, sphere or more complex configuration.

Simple compression joints may avoid some of the problems associated with plastic adhesives but are themselves attended by different problems. For example, the high pressure necessary to make a vibration or otherwise stress-resistant joint between the fastener and substrates being joined may damage delicate parts. Also, this pressure tends to embrittle and/or distort or reduce the cross-sectional area of the materials being joined. Mechanical fasteners also tend to be bulky and to require complex machinery for their installation as use of a simple tool may result in overstressing of the joint by the operator. If a sophisticated tool is used, it is usually large in relation to the job and expensive. Furthermore, it does not entirely eliminate the possibility that excessive force will be applied in crimping, tightening or swaging operations.

In view of the problems outlined above faced by those skilled in the art of joining materials, there has gone unsatisfied a long standing need for coupling means and a method by which it is used to effect the union of materials that will substantially preserve the configuration of the substrates and their physical or chemical properties that are physically and economically suitable for both field and factory application under a variety of conditions.

Accordingly, it is an object of the present invention to provide an improved coupling means for joining materials. It is another object of this invention to provide an improved method for joining substrates. More specifically, it is an object of this invention to provide a coupling means and a method by which it is used to form a joint between substrates that substantially preserves their configuration and properties.

The satisfaction of these and other objects by the present invention will be apparent to those skilled in the art after consideration of the following description of the invention.

SUMMARY OF THE INVENTION

According to the present invention there is provided coupling means for joining substrates comprising a first innermost member, having disposed thereon a fusible agent which when melted will flow through or about the substrates to be joined and bind them together when subsequently cooled, and an outer member, the inner and outer members defining a space into which the substrates to be joined are inserted and acting to contain the fusible agent when in the molten state. Union between the substrates is accomplished by inserting the substrates between the inner and outer members and heating the assembly to raise the temperature of the fusible agent until it will melt and flow into contact with the heated substrates, the flow being facilitated by capillary action, and subsequently cooling the assembly thereby allowing the fusible agent to reharden and bind together the substrate.

The outer member is preferably either transparent or has perforations located about its periphery to allow visual inspection of the bond and provide positive indication that the fusible agent has properly and sufficiently flowed. The outer and inner members jointly function to provide a means of holding or clamping the substrates in proper position for joining. In one preferred embodiment the outer member is a metal clamp.

DETAILED DESCRIPTION OF THE INVENTION

Figure 1:
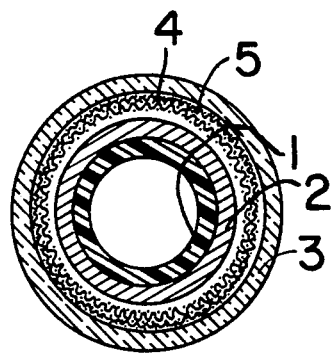
FIG. 1 is a schematic diagram illustrating the principle of the present invention.

Referring now to the drawings, FIG. 1 schematically illustrates the basic principle of the present invention which is to advantageously employ the temperature gradient which occurs when the coupling means of the present invention is heated from the outside. In FIG. 1, the innermost circular area represents the inner member of the coupling means; the adjacent and larger circular area 2 represents the fusible agent carried by the inner member; the circular area 3 represents the outer member of the coupling means; and circles 4 and 5 in the form of broken lines represent substrates to be joined having means whereby the fusible agent can pass through or about the substrates to achieve contact therewith.

When the outer member 3 is heated, a temperature gradient through the assembly is established. Capillary action draws the fusible agent toward the heat source. Consequently, when the fusible agent melts, it flows toward the outside member and through and about the substrate members 4 and 5 to be joined. If substrate members 4 and 5 are metallic, and the fusible agent 2 is a suitable solder, an intermetallic joint is formed between 4 and 5. In preferred embodiments of this invention, outer member 3 is either transparent or, if opaque, provided with windows to allow a viewer to observe the formation of the joint. This ensures that the heat source being used can be removed at the earliest possible time to ensure that the substrates to be joined or surrounding materials are not overheated.

Figure 2:
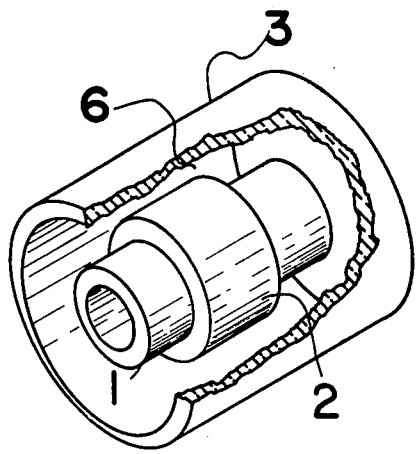
FIG. 2 is a perspective view of the coupling means of the present invention.

In FIG. 2, which for clarity uses the same numbering as FIG. 1, there is shown, as a cutaway perspective, a presently preferred embodiment of the coupling means of the present invention. Inner member 1 and outer member 3 are tubular in shape and concentrically arranged to define annular space 6 to receive tubular substrates 4 and 5, not shown. Disposed about inner member 1 is fusible agent 2 which may, for example, be a solder, a thermoplastic adhesive or a thermosetting adhesive. Specific fusible agents are selected according to the nature of the substrates being joined.

As shown in FIG. 2, inner member 1 is a hollow cylinder. This is necessary if the substrates being joined are required to carry a fluid, for example a liquid or gas. A hollow cylinder can also be used to house delicate parts and shield them from the heat required to effect the union. However, if the substrates being joined are merely structural members, inner member 1 can be a solid cylinder. In FIG. 2, the fusible agent 2 is disposed about the middle portion only of the inner member 1. This allows some lateral flow of the fusible agent during joint formation without its flowing off the end of the inner member. However, if other means are provided to limit lateral flow, as will hereinafter be illustrated, the fusible agent and inner member can be coterminous.

According to one presently preferred embodiment of the invention, inner member 1 is a heat recoverable member having the property of elastic memory, and being capable of expanding to a larger diameter. Such a member can be fabricated from metallic as well as polymeric materials, for example, of the type described in U.S. Pat. Nos. 3,783,037 and 2,027,962 by methods well known to the art. With these materials, a variety of suitable fusible agents can be employed. Illustrative are solders, mastics, thermoplastic adhesives, fusible ceramics, filled elastomers, melt-flowable dispersions and suspensions and the like. In some cases it may be desired that the fusible agent be tacky. In such a case, a release paper or other suitable protective agent can be provided which is removed when the coupling means and substrates are assembled. When the coupling means and assembled substrates are heated, the heat expandable inner member 1 can undergo expansion to further urge the flow of the fusible agent through and about the substrates to be joined.

Outer member 3, can be a rigid member easily penetrated by heat. It acts in concert with inner member 1 to contain the flow of the fusible agent and to provide a counter acting force to inner member 1 if the latter is heat expandable. Outer member 3 can alternatively be heat recoverable whether or not inner member 1 possesses this property to thereby provide inwardly directed compressive force to facilitate the flow of the fusible agent. In many applications, outer member 3 can suitably be a conventional spring or adjustable clamp so long as it allows sufficient heat to penetrate the assembly.

Preferably outer member 3 is of a transparent material. If opaque, it can be provided with openings or windows by perforating the material to allow an observer to view the joint as it is being formed.

Figure 3:
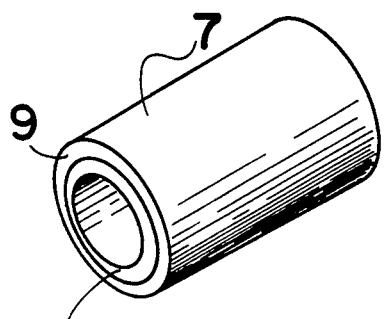
FIGS. 3–5 illustrate in perspective members useful in the coupling means of the invention.
Figure 4:
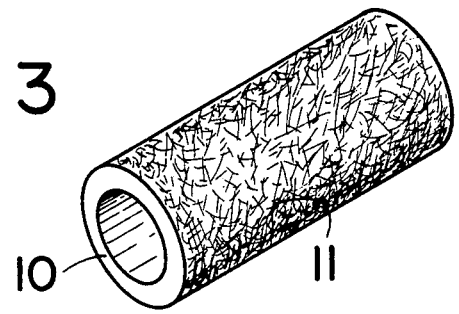
Figure 5:
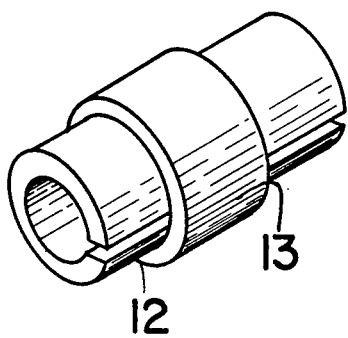

In FIGS. 3–5 are shown specific embodiments of inner members useful in the present invention. Referring now to FIG. 3 there is shown a monolithic inner member 7 of a polymeric material having a selectively crosslinked inner portion 8 and a substantially un-crosslinked outer portion 9. Preferably, the inner portion is crosslinked enough that it can be rendered heat recoverable rather than crosslinked to such an extent that it becomes intractible. Crosslinking polymeric materials to render them heat recoverable is described in Cook, U.S. Pat. No. 3,086,242, the disclosure of which is incorporated by reference. In use, the inner member of FIG. 3 when heated will melt and flow in its uncrosslinked portion but remain rigid or exhibit heat recovery in the portion crosslinked. A structure similar to that of FIG. 3 may be obtained by combining discrete lamina of a fusible material 9 over a non-fusible core material 8.

FIG. 4 illustrates an inner member 10 having disposed thereon a particulate fusible agent 11. In use, the particulate, fusible agent will flow to form a continuous mass. Such a member has the advantage that its formation can be accomplished without using heat, for example, the particulate fusible agent can be sprayed in a suitable binder onto the surface. Therefore, the inner member can be rendered heat recoverable prior to the application of the fusible agent without fear that the assembly with a discrete fusible agent would occassion its recovery. Therefore, the inner member can be deformed a precise and predetermined extent to insure a desired post-recovery dimension.

In FIG. 5, the inner member 12 is an axially slotted tubular member having fusible agent 13 disposed about it as a continuous band. In this configuration, inner member 12 can be a compressed spring which will expand to apply a compressive force when fusible agent 13 is heated to its melt temperature. Similarly, inner member 12 can be a heat expandable member capable of a high percentage of recovery by virtue of the slot.

In the embodiments heretofore described, the coupling means has been made up of tubular members symmetrical about their coaxis. It will be appreciated by those skilled in the art that other, non-regular, configurations are possible. Two such examples are illustrated in FIGS. 6 and 7.

Figure 6:
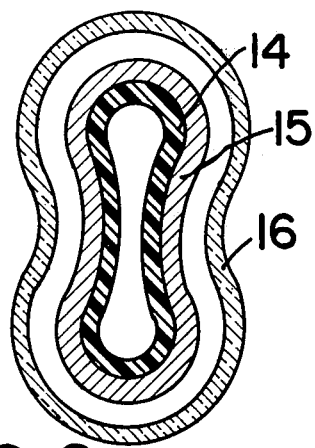
FIGS. 6 and 7 are views in cross-section of coupling means according to the present invention.

In FIG. 6, there is shown, in cross-section, coupling means which might be employed to join substrates having an hour-glass configuration comprising irregularly shaped inner member 14, fusible agent 15, and irregularly shaped outer member 16.

Figure 7:
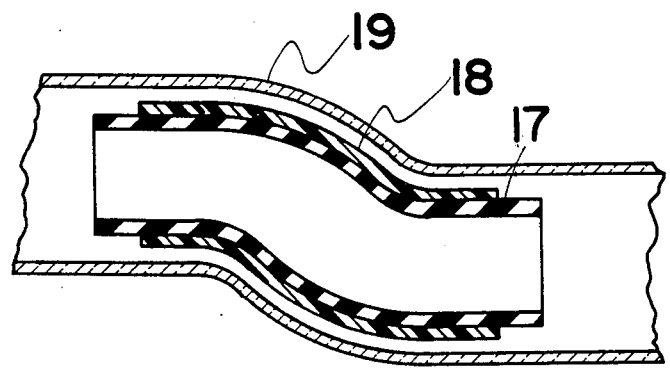

In FIG. 7, there is shown in longitudinal cross-section yet another embodiment of the present invention for use with tubular substrates that are bent near the ends to be joined comprising bent inner member 17, fusible agent 18, and bent outer member 19.

Figure 8:
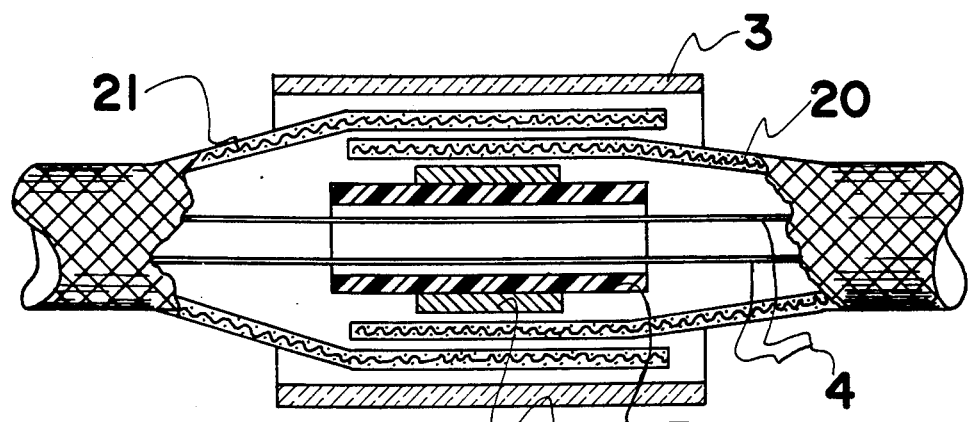
FIGS. 8 and 9 illustrate an application of the present invention.
Figure 9:
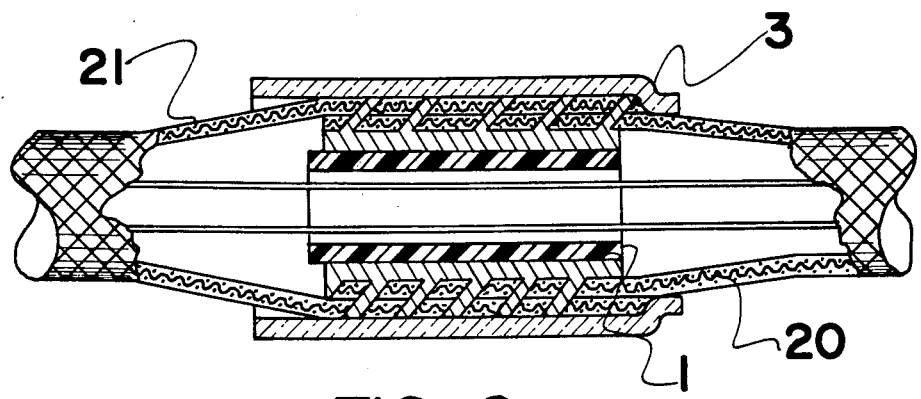

A particular application of the coupling means of FIG. 2 for making a joint between tubular substrates 20 and 21 of woven wire or plastic braid is shown in FIGS. 8 and 9. FIG. 8 illustrates the assembly before heating. In FIG. 8, inner member 1 is a rigid tube, acting as a support member and as a heat shield for wires 4 located inside braids 20 and 21. Fusible agent 2 comprises a material selected for its ability to bind the tubular braided substrates together. If the substrates are wire, preferably the agent is a solder; if plastic, preferably the agent is an adhesive for joining plastic materials. Inner member 1 and its fusible agent 2 are sized so that they can be inserted into the tubular braid members 20 and 21. The braided substrates are arranged so that one overlaps the other and arranged around these components is outer member 3, in this case a heat recoverable member.

When the assembly of FIG. 8 is heated, outer member 3 shrinks tightly onto the substrates, urging them into mutual contact, and in turn the inner substrate into contact with fusible agent 2.

During the heating cycle, heat is conducted inwardly through the substrates to the fusible agent. The fusible agent melts and flows and is drawn by capillary action through and about the woven members of the braided substrate.

Emergence of fusible material at the outer surface of the outer substrate indicates that the fusible agent has undergone sufficient flow. When the fusible agent has undergone sufficient flow, the heat source can be removed and the joint cooled. The resulting joint is shown, also in cross-section, in FIG. 9.

Figure 10:
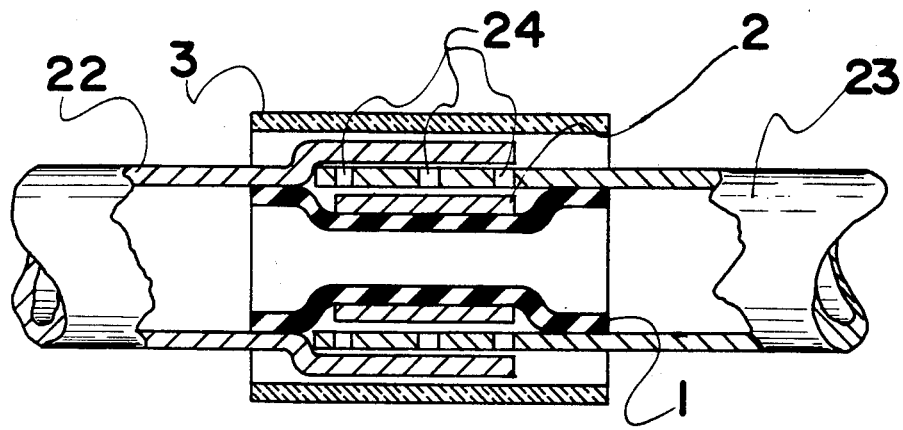
FIGS. 10 and 11 illustrate another application of the present invention.
Figure 11:
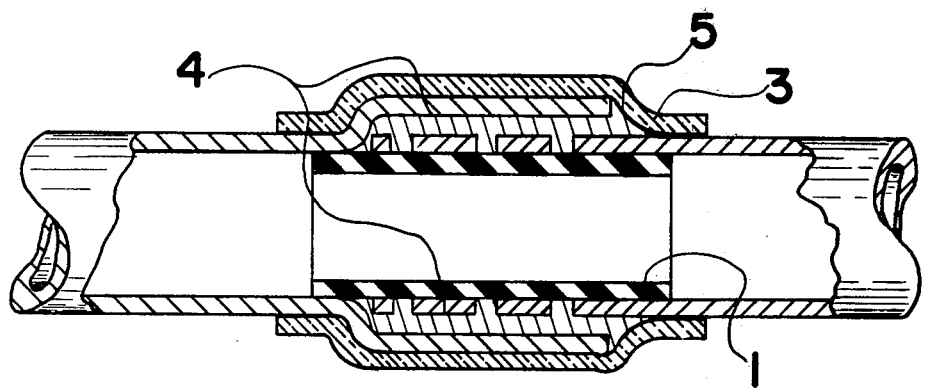

Another application of the coupling means of the present invention is shown in FIG. 10 and 11 illustrating its use in coupling a pair of rigid pipes 22 and 23, which for the purposes of illustration only may be regarded as being metallic in nature. As is common practice in the art, one tube (in this case 22) has been expanded in diameter near its end to allow its insertion over the other pipe 23. The straight overlapped pipe 23 is provided with a plurality of peforations 24. Inner member 1 is shown as an elastomeric tube and fusible agent 2 in this case can suitably be a solder and flux mixture. Inner member 1, an elastomeric tube, also acts as a "dam" against longitudinal movement of the solder.

Preferably, outer member 3 is a heat shrinkable member. When the assembly of FIG. 10 is heated, fusible agent 2 melts and flows into the perforations 24, its flow being facilitated by capillary action, by the temperature gradient created by the heating and by recovery of the elastomeric inner member 1 which expands in diameter. The effects of heating are shown in FIG. 11 in which it can be seen that fusible agent 2 has flowed to fill the perforations and bind pipes 22 and 23 together. Fusible agent 2 also penetrates the annular space 4 between the pipes to facilitate the bond, becomming visible under the outer member at 5.

Figure 12:
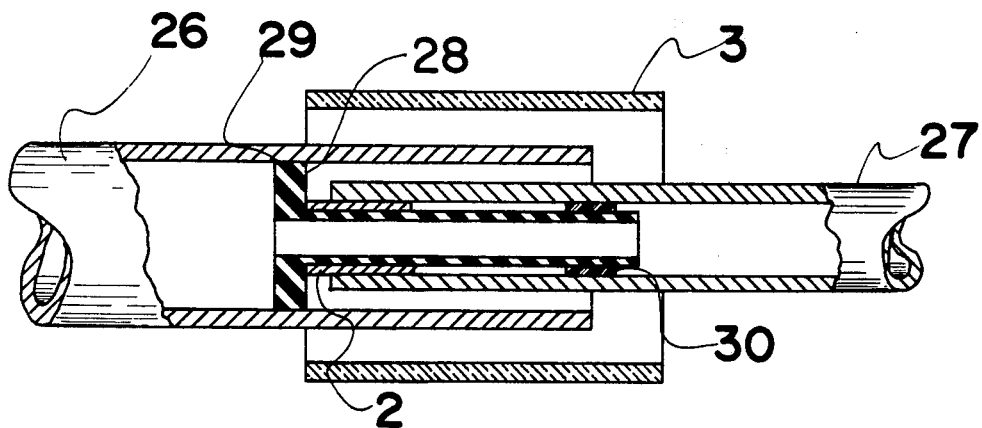
FIGS. 12 and 13 illustrate yet another application of the present invention.
Figure 13:
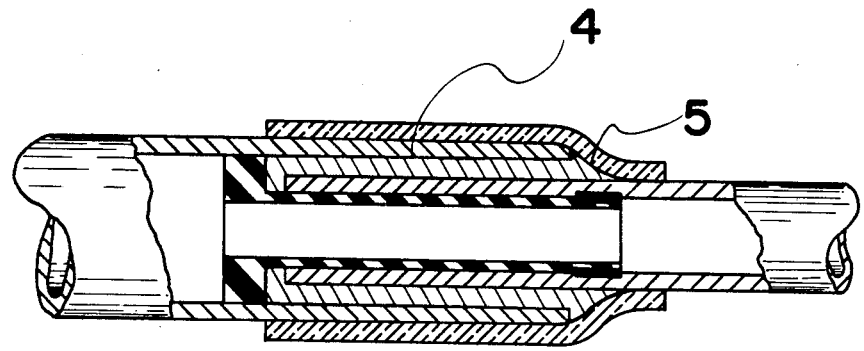

A variation of the coupling means of FIGS. 10 and 11 is shown in FIGS. 12 and 13. In FIG. 12, it can be seen that tubes 26 and 27, which are free of perforations and which are of different diameter, are joined in an overlapping arrangement.

Inner member 29, differs from inner member 1 of FIGS. 10 and 11 in that it is a stepped rather than a regular cylinder. Fusible agent 2 is disposed about its smaller outside diameter. The inner member is also provided with a dam 30 to block longitudinal flow of the fusible agent. The shoulder 28 of the stepped cylinder member blocks longitudinal flow in the other direction.

Preferably, both the inner and outer members are heat recoverable, inner member 29 being heat expandable while outer member 3 is heat shrinkable. The assembly after heating is shown in FIG. 13. Heating is terminated when the fusible agent, having flowed through anular space 4 is visible at 5, beneath outer members 3 which is preferably transparent or provided with windows or other means by which flow of the fusible agent can be observed.

Figure 14:
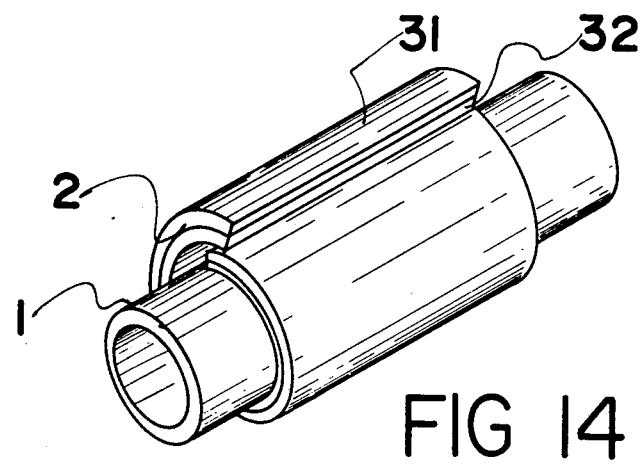
FIG. 14 illustrates in perspective a member useful in the coupling means of the present invention.

FIG. 14 illustrates yet another inner member useful in the present invention wherein the inner member 1 carries about it's periphery a laminar structure 2 comprising a discrete coiled strip 32 to which is laminated the fusible agent 31. The lamination is a coil, so that upon heating the coupling means of the present invention, the outer member (not shown, but similar to any of the outer members discussed elsewhere in this disclosure), will cause a force to be exerted upon the materials to be joined together, thus causing not only the urging of the fusible material into the materials to be joined together as discussed elsewhere in this disclosure, but also causing the lamination 32 to be urged to a smaller diameter because of its coiled structure. Further, upon heating the article of the present invention, the ends of the coil may also become joined together, along with the other materials to be joined, bu the fusible agent 31.

Figure 15:
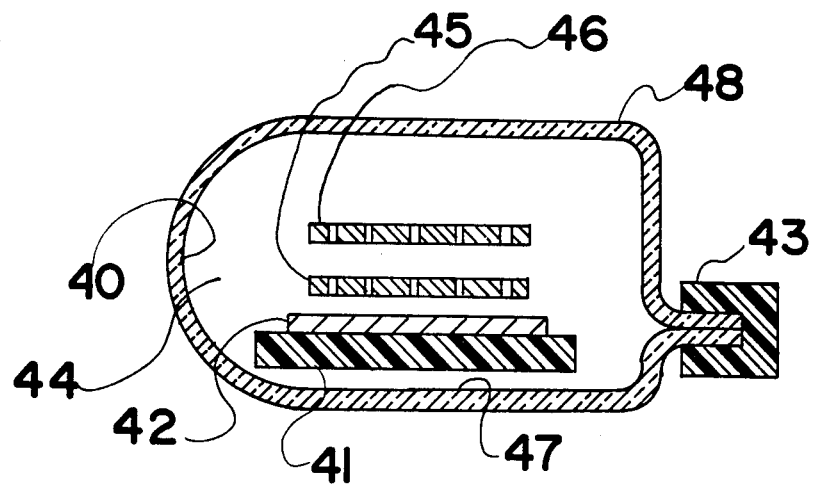
FIG. 15 illustrates another application of the present invention.

Referring now to FIG. 15, there is illustrated a coupling means according to the present invention the axial cross-section of which resembles a flat envelope. The outer member 40 surrounds the rigid inner member 41 and fusible material 42 and is openable by means of a conventional latch assembly 43. In this particular embodiment of the present invention the rigid inner member 41 may or may not be bonded directly to the adjacent wall 47 of the outer member 40. The space 44 between the fusible material 42 and the opposing wall of outer member 40 is the location where substrates to be joined, 45 and 46, are placed. In this illustrative embodiment of the present invention the advantages of a side entry technique are realized. The substrates to be joined can be located in such a way that it is not practical to cause a break in the continuous materials to be joined or to make available an end of the materials so as to be able to slide a tubular outer member into position to effect a joint. Referring specifically to FIG. 15, upon heating the upper surface 48 of the outer member 40 which in this illustration of the article of the invention is intended to be a heat recoverable material exhibiting the properties of elastic memory as described in U.S. Pat. No. 2,027,962, causes the outer member to recover. Further heating will urge the materials to be joined together into intimate contact with each other as previously described. When the heat reaches the fusible material 42, which may be any of the fusible materials discussed elsewhere in this disclosure, it is drawn and/or forced up through or around the substrates to be joined in the space 44 occupied by these materials. As described elsewhere in this disclosure, when the fusible material 42 becomes visible through the materials to be joined together under the surface of the outer member 40, the desired joint has been effected and heating is discontinued.

The present invention has been illustrated by describing presently preferred embodiments. It is a specific advantage of the present invention over the prior art that any particular part of the article of the present invention may be of a rigid material. Thus, in various and specific combinations, any particular embodiment of the present invention may be comprised of rigid and elastic materials, fusible and non-fusible materials, discrete and monolithic laminations, expandable and shrinkable recoverable materials, materials which recover and materials which do not recover, and metallic combined with non-metallic materials.

Clearly, the temperature at which the fusible materials and the recoverable materials exhibit their specific properties is not limited except by practical bounds. For example, certain recoverable materials may remain in their pre-recovery or non-fused state only under the influence of liquid nitrogen and upon reaching ambient temperature undergo recovery or pass into a flowable state. Further, the various materials may have to be heated several hundred degrees centrigrade before exhibiting the properties for which they were chosen in specific applications of the present invention. It is a further advantage of the present invention that the expanding or shrinking of any of the various particular parts of the coupling means may be restrained from exhibiting that particular property by another of the particular parts of the article of the present invention. For example, the inner member of the article of the present invention may be held in a heat recoverable mode by physical contact or bonding to a solder ring acting as the fusible agent. Upon application of heat, the solder will melt and flow allowing the inner member to undergo the diametric expansion property for which it was chosen. These members could also be metallic springs held in tension or compression by another member, exhibiting tension or compression or both when the other member gives way as by melting.

It is a specific further advantage of the present invention over the prior art that the method of heating the articles of the present invention together with the materials to be joined together, can be any of the heating methods known to those skilled in the art of heating materials such as conduction, convection or radiant heating, radiation heating, induction heating, dielectric heating, electric resistance heating, heat generated by an exothermic reaction, contact with a hot solution or material, or exposure of referigerated materials to ambient or lower temperatures. Further, the various separate parts of the articles of the present invention may freeze, melt, fuse, recover or remain stable at the same or different temperatures than any of the other various separate parts of a specific embodiment of the present invention.

Having fully described the fundamental concepts of the present invention, acknowledging the limitations of describing only a few of the possible configurations and applications, it is to be understood that this invention is not to be limited to the specific examples set forth, but is the full scope of the appended claims.

I claim:

1. Coupling means for joining together at least two substrates comprising an inner member having disposed on its outer surface solder to bind the substrates together, and a heat recoverable outer member which surrounds said inner member so as to define between the inner surface of the outer member and the outer surface of the inner member a space into which the substrates are inserted, the application of heat to fuse said solder occasioning the movement of at least the outer surface toward said inner surface so as to diminish said space and direct the flow of said solder toward the outer member wherein the strength of the couple formed after heating is provided substantially solely by said solder.

2. Coupling means according to claim 1 wherein said solder becomes less viscous with an increase in temperature.

3. Coupling means according to claim 1 wherein said inner and outer members are coaxially disposed relative to each other.

4. Coupling means according to claim 3 wherein said inner member is a heat expandable cylinder.

5. Coupling means according to claim 3 wherein said inner member is elastomeric.

6. Coupling means according to claim 3 wherein said outer member is a heat shrinkable cylinder.

7. Coupling means according to claim 3 wherein said outer member is elastomeric.

8. Coupling means according to claim 3 wherein said cylinder is hollow and is slotted longitudinally.

9. Coupling means according to claim 3 wherein said inner member is a cylindrical spring member held in compression by said solder.

10. Coupling means according to claim 3 wherein said outer member is a cylindrical spring clamp.

11. Coupling means according to claim 3 wherein both said inner and said outer members are longitudinally slotted.

12. Coupling means according to claim 3 wherein said fusible agent comprises a plurality of different materials.

13. Coupling means according to claim 1 wherein said inner member is equipped with dam means.

14. Coupling means according to claim 1 wherein said solder comprises a discrete layer on said inner member.

15. Coupling means according to claim 1 wherein said inner member and said fusible agent are, respectively, the crosslinked and substantially non-crosslinked portions of a selectively crosslinked polymeric member.

16. Coupling means according to claim 15 wherein said polymeric member is a hollow cylinder.

17. Coupling means according to claim 1 wherein said outer member is substantially transparent.

18. Coupling means according to claim 1 wherein said outer member is an opaque member havng perforations therethrough.

19. Coupling means according to claim 1 said inner member and outer member being fabricated from a material selected from the group consisting of metallic compositions and polymeric compositions.

20. A coupling means according to claim 40 wherein said outer member is capable of beng removed upon cooling without impairing the strength of the couple after heating.

21. Coupling means for joining together at least two substrates coaxially disposed relative to each other comprising an inner heat expandable member having disposed on its outer surface a fusible agent to bind the substrates together, and a heat recoverable outer member which surrounds said inner member so as to define between the inner surface of the outer member and the outer surface of the inner member a space into which the substrates are inserted, the application of heat to fuse said agent occasioning the movement of the outer surface toward said inner surface so as to diminish said space and direct the flow of said agent.

22. A couple joining together at least two substrates comprising an inner member having disposed on its outer surface a fusible agent to bind said substrates together, a heat recoverable outer member which surrounds said inner member so as to define between the inner surface of the outer member and the outer surface of the inner member a space into which the substrates have been inserted, the application of heat having fused said agent and having occasioned the movement of at least the outer surface toward said inner surface thereby diminishing said space and directing the flow of said agent toward the outer member, the strength of said couple being provided substantially solely by said fusible agent.

23. A couple according to claim 22 wherein said outer member is removed after recovery.

24. A couple according to claim 22 wherein said substrate is braided shielding.

25. Couple according to claim 22 wherein said substrates are woven electrical shielding.

26. Couple means according to claim 22 wherein said fusible agent flows by capillary action toward the source of heat.

27. Couple means according to claim 22 wherein said substrates are cylindrical.

* * * * *